US007309381B2

(12) United States Patent
Yamazaki et al.

(10) Patent No.: US 7,309,381 B2
(45) Date of Patent: *Dec. 18, 2007

(54) GAS STORAGE CANISTER

(75) Inventors: Koji Yamazaki, Saitama (JP); Kenji Seki, Osaka (JP)

(73) Assignees: Mahle Filter Systems Japan Corporation, Tokyo (JP); Osaka Gas Co., Ltd., Osaka-shi (JP)

( * ) Notice: Subject to any disclaimer, the term of this patent is extended or adjusted under 35 U.S.C. 154(b) by 298 days.

This patent is subject to a terminal disclaimer.

(21) Appl. No.: 11/060,585

(22) Filed: Feb. 18, 2005

(65) Prior Publication Data

US 2005/0188851 A1 Sep. 1, 2005

(30) Foreign Application Priority Data

Feb. 20, 2004 (JP) ............................ 2004-044253

(51) Int. Cl.
*B01D 53/02* (2006.01)
*F02M 23/08* (2006.01)

(52) U.S. Cl. ........................................ 95/153; 123/519

(58) Field of Classification Search .................. 96/108, 96/147, 153; 123/518, 519, 520, 521
See application file for complete search history.

(56) References Cited

U.S. PATENT DOCUMENTS

2005/0247202 A1* 11/2005 Seki ............................ 96/146
2006/0144228 A1* 7/2006 Reiners et al. ................ 95/144

FOREIGN PATENT DOCUMENTS

| | | | |
|---|---|---|---|
| DE | 10329200 | A1 * | 3/2005 |
| JP | 2001-145832 | A | 5/2001 |
| JP | 2001-248504 | A | 9/2001 |
| JP | 2003-311118 | A | 11/2003 |
| WO | WO 2005/005022 | A1 * | 1/2005 |

* cited by examiner

*Primary Examiner*—Frank M. Lawrence
(74) *Attorney, Agent, or Firm*—Foley & Lardner LLP

(57) ABSTRACT

A vapor storage canister used to treat fuel vapor of an automotive internal combustion engine. The vapor storage canister includes a casing. A granular formed heat accumulative material is disposed in the casing and includes a powdered heat accumulative agent formed of micro-capsules each of which contains a phase changing material which makes adsorption and release of latent heat in accordance with a temperature change. The granular formed heat accumulative material further includes a binder for binding the heat accumulative agents. Additionally, a granular gas adsorbing material disposed in the casing and mixed with the heat accumulative material.

11 Claims, 4 Drawing Sheets

GAS STORAGE CANISTER

BACKGROUND OF THE INVENTION

This invention relates to improvement in a gas storage canister, for example, using activated carbon or the like in order to treat fuel vapor of an automotive internal combustion engine.

In an automotive internal combustion engine for instance, a gas storage canister is provided to be able to store and release fuel vapor for the purpose of preventing fuel vapor generated in a fuel tank from releasing out of an automotive vehicle. Fuel vapor generated, for example, after a vehicle stopping is temporarily stored in the gas storage canister and is released together with fresh air from the gas storage canister to be introduced into the engine when the engine is operated after the vehicle stopping. Here, the following fact is known: In the gas storage canister using a gas adsorbing material such as activated carbon or the like, an exothermic reaction occurs when fuel vapor is adsorbed to the gas adsorbing material, so that the temperature of the gas adsorbing material rises. This temperature rise lowers a gas adsorbing ability of the gas adsorbing material. In contrast, an endothermic reaction occurs when fuel vapor is desorbed from the gas adsorbing material, so that the temperature of the gas adsorbing material lowers. This temperature drop lowers a gas desorbing ability of the gas adsorbing material.

In order to solve the above problems, Japanese Patent Provisional Publication No. 2001.248504 discloses a gas storage canister in which, in a casing, a gas adsorbing chamber is formed to be located at the side of one end wall provided with fuel vapor inlet and outlets while a heat accumulating and gas adsorbing chamber is formed to be located at the side of the other end wall provided with an atmospheric air communication opening. The gas adsorbing chamber is filled with a gas adsorbing material while the heat accumulating and gas adsorbing chamber is filled with a gas adsorbing material and a heat accumulative material.

Japanese Patent Provisional Publication No. 2001-145832 discloses a powdered heat accumulative agent which is produced by encapsulating a phase change material in micro-capsules which phase change material makes absorption and release of latent heat in accordance with a phase change. The powdered heat accumulative agent is uniformly mixed with powdered activated carbon (gas adsorbing material) and formed together with a binder into a certain shape, thereby obtaining a latent heat reservation type gas adsorbing material. Under the addition of the heat accumulative agent, a temperature change due to adsorption and desorption of fuel vapor may be suppressed to increase fuel vapor adsorbing and desorbing performances of the fuel gas adsorbing material.

Japanese Patent Provisional Publication No. 2003-311118 discloses a latent heat reservation type gas adsorbing material in which powdered heat accumulative material formed by micro-encapsulation similarly to in the above Japanese Patent Provisional Publication No. 2001-145832 is adhered to the surface of granular activated carbon having relatively large grain sizes.

However, the above conventional techniques have encountered in the following difficulties: In the technique of Japanese Patent Provisional Publication No. 2001-248504, the casing is formed into such a shape that heat absorption and release can be easily made, and a metal or the like having a higher specific heat is used as the heat accumulative material to soften the temperature change. However, there is a restriction for the shape of a layer of the gas adsorbing material while decreasing the amount of the gas adsorbing material to be filled in the casing.

In the technique of Japanese Patent Provisional Publication No. 2001-145832, if the latent heat reservation type gas adsorbing material is applied to a gas storage canister, the finely powdered gas adsorbing material is surrounded with the powdered heat accumulative agent having no gas adsorbing action, and therefore the adsorbing rate of gas may be lowered. Additionally, when a mixture of the powdered heat accumulative agent and the gas adsorbing material is formed together with the binder into the certain shape, it is required to accomplish the formation under a sufficient pressure in order to increase the adsorbing amount per unit volume. However, in case that the powdered heat accumulative agent and the gas adsorbing material are pressurized in a state where they are mixed, the micro-capsules are liable to be broken because the hardness of the outer shell of the micro-capsules formed of melamine or the like is low as compared with that of the powdered gas adsorbing material formed of activated carbon or the like so that the micro-capsules and the gas adsorbing material are largely different in hardness. In this regards, particular micro-capsules or particular forming methods are required. Thus, with usual micro-capsules and usual forming methods, the micro-capsules are liable to be broken, and therefore a desired heat reservation effect may not be obtained.

In the technique of Japanese Patent Provisional Publication No. 2003-311118, in case that the latent heat reservation type gas adsorbing material is applied to a gas storage canister, the surface of the activated carbon as the gas adsorbing material may be covered with the powdered heat accumulative agent having no gas adsorbing action. In such a situation, fuel vapor or the like to be adsorbed passes through the layer of the heat accumulative agent and reaches the gas adsorbing material, so that the adsorbing rate of fuel vapor is further lowered. Additionally, if the powdered heat accumulative agent is not fixed with a binder or the like in the gas storage canister, the powdered heat accumulative agent and the activated carbon will be gradually separated from each other within a casing under, for example, the repeated vibration applied during vehicle running.

SUMMARY OF THE INVENTION

It is an object of the present invention to provide an improved gas storage canister which can effectively overcome drawbacks encountered in conventional gas storage canisters or the like of the similar nature.

Another object of the present invention is to provide an improved gas storage canister by which separation of a gas adsorbing material and a heat accumulative material can be effectively suppressed even upon receiving vibration under vehicle running, thereby maintaining a high performance of the gas storage canister throughout a long period of time.

A further object of the present invention is to provide an improved gas storage canister in which a heat accumulative material can exist in such a mixed state with a gas adsorbing material as not to degrade the gas adsorbing action of the gas adsorbing material while preventing breakage of micro-capsules forming part of the heat accumulative material.

An aspect of the present invention resides in a vapor storage canister comprising a casing. A granular formed heat accumulative material is disposed in the casing and includes a powdered heat accumulative agent formed of micro-capsules each of which contains a phase changing material which makes absorption and release of latent heat in accordance with a temperature change. The granular formed heat accumulative material further includes a binder for binding the heat accumulative agents. Additionally, a granular gas adsorbing material disposed in the casing and mixed with the heat accumulative material.

Another aspect of the present invention resides in a method of producing a vapor storage canister, comprising the steps of: (a) forming a powdered heat accumulative agent formed of micro-capsules into a granular heat accumulative material by mixing the powered heat accumulative agent with a binder, each of the micro-capsule containing a phase changing material which makes absorption and release of latent heat in accordance with a temperature change; (b) forming a granular gas adsorbing material; and (c) mixing the granular heat accumulative material and the granular gas adsorbing material and filling them into a casing.

DETAILED DESCRIPTION OF THE INVENTION

Figure 1:
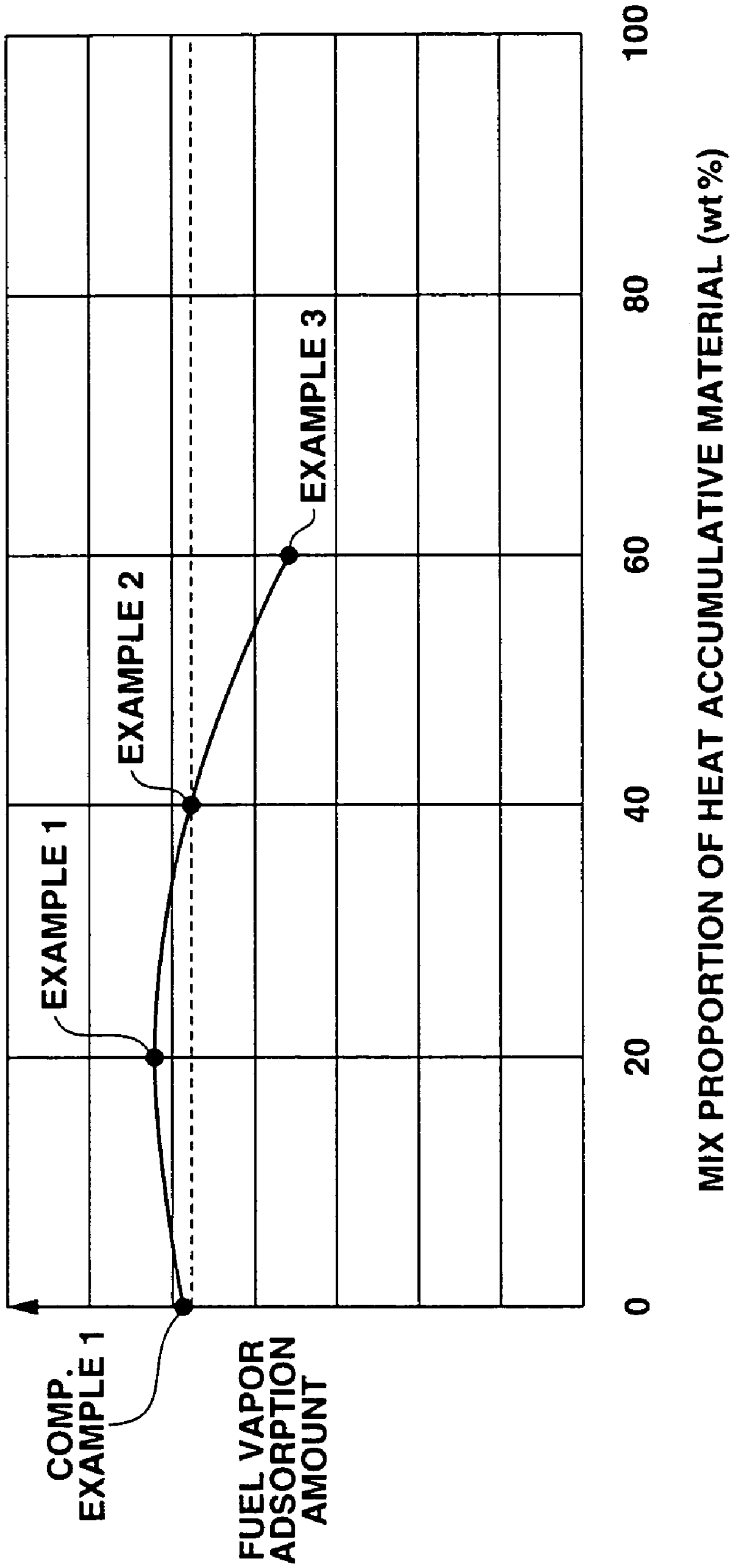
FIG. 1 is a graph showing the relationship between the mix proportion of a heat accumulative material (% by weight) and the fuel vapor adsorption amount, for Examples 1 to 3 and Comparative Example 1.

According to the present invention, a vapor storage canister comprises a casing. A granular formed heat accumulative material is disposed in the casing and includes a powdered heat accumulative agent formed of micro-capsules each of which contains a phase changing material which makes absorption and release of latent heat in accordance with a temperature change. The granular formed heat accumulative material further includes a binder for binding the heat accumulative agents. Additionally, a granular gas adsorbing material disposed in the casing and mixed with the heat accumulative material.

As the heat accumulative agent formed by micro-encapsulation, known ones disclosed in Japanese Patent Provisional Publications 2001-145832 and 2003-311118 may be used, so that these Japanese Patent Provisional Publications are incorporated herein by reference.

The phase change material is preferably an organic or inorganic compound(s) having a melting point ranging from 10 to 80° C. Examples of the phase change material are normal or straight-chain aliphatic hydrocarbons such as tetradecane, pentadecane, hexadecane, heptadecane, octadecane, nonadecane, eicosane, heneicosane, docosane, natural wax, petroleum wax, hydrate of inorganic compounds such as $LiNO_3.3H_2O$, $Na_2SO_4$. $10H_2O$, $Na_2HPO_4.12H_2O$, fatty acids such as capric acid and lauric acid, higher alcohols having the carbon number ranging from 12 to 15, and esters such as methyl palmitate and methyl stearate. These phase change materials may be used in combination (of two or more compounds or phase change materials). The phase change material is used as a core material of the micro-capsule. The micro-capsule is formed by known methods such as a coacervation method, an in-situ method (or interface reaction method) and the like. The micro-capsule has an outer shell which is formed of known materials such as melamine, gelatin, glass and the like. The micro-capsule of the heat accumulative agent preferably has a particle diameter ranging from about several μm to about several ten μm. If the particle diameter of the micro-capsule is excessively small, the rate occupied by the outer shell constituting the micro-capsule increases so that the rate occupied by the phase change material repeating its dissolution and solidification decreases, thereby lowering a heat reservation amount of the powdered heat accumulative agent per unit volume. In contrast, if the particle diameter of the micro-capsule is excessively large, the strength of the micro-capsule is required to be increased thereby increasing the rate occupied by the outer shell constituting the micro-capsule, thus lowering the heat reservation amount of the powdered heat accumulative agent per unit volume.

According to the present invention, the powdered heat accumulative agent formed by the micro-encapsulation is mixed with the binder and formed into a suitable shape having suitable dimensions, thereby obtaining the granular formed heat accumulative material. Since only the heat accumulative material is formed using the binder, breakage of the micro-capsules during formation can be suppressed to the minimum. Although a variety of binders may be used as the binder of the present invention, thermosetting resin(s) such as phenol resin and acrylic resin is preferably used from the viewpoints of stability against temperature and solvent required by the final product or vapor storage canister. This granular formed heat accumulative material is used upon being mixed with the similarly granular gas adsorbing material thereby suppressing separation of them upon receiving vibration while ensuring a desired heat reservation effect. Additionally, suitable clearances can be secured between granules of the formed heat accumulative material and the gas adsorbing material thereby preventing adsorption and desorption of vapor from being degraded while maintaining a pressure loss of the vapor storage canister at a low value. Further, the outer surface of granule of the gas adsorbing material is not covered with the powdered heat accumulative agent, and therefore baneful effects such as lowering an adsorption rate cannot be made. Here, the granular formed heat accumulative material preferably has particle diameters ranging from about several hundreds μm to about several mm.

The size of the granular formed heat accumulative material and the size of the granular gas adsorbing material are preferably the same or similar so as to suppress separation of them upon time lapse and to suitably secure passages through which gas flows. In concrete, the average particle diameter of the formed heat accumulative material is preferably within a range of 10 to 300%, more preferably within a range of 50 to 150%, of the average particle diameter of the gas adsorbing material.

As the above gas adsorbing material, a variety of gas adsorbing material may be used in which activated carbon is preferably used. The gas adsorbing material may be used upon being formed to have suitable dimensions, or used upon being classified into portions having certain meshes. Similarly, the granular formed heat accumulative material has been formed to have certain dimensions, or otherwise may be used by pulverizing a formed heat accumulative material having relative large dimensions.

A preferable embodiment of the gas storage canister will be discussed.

It is preferable that the formed heat accumulative material and the gas adsorbing material has a formed body having a particle size (or the largest dimension) ranging from 1 to 5 mm and having a shape such as a spherical shape, a column-like shape, a polygonal shape and the like which are selectively used, so that there is no limitation in shape. More preferably, the formed heat accumulative material and the gas adsorbing material has a column-like shape and have diameters ranging from 1 to 3 mm and lengths ranging from 1 to 5 mm. Such column-like formed heat accumulative material and gas adsorbing material are readily obtained by continuously extruding a raw material and then by cutting or breaking the extruded raw material. By using the column-like formed heat accumulative material and gas adsorbing material in combination, separation of them upon time lapse can be further securely suppressed.

It is preferable that the formed heat accumulative material has a bulk density (packing density) or weight per unit volume, ranging from 0.1 to 1.5 g/cc, while the gas adsorbing material has a bulk density ranging from 0.1 to 1.5 g/cc. It is more preferable that each of the formed heat accumulative material and the gas adsorbing material has a bulk density ranging from 0.2 to 0.6 g/cc.

Additionally, it is preferable that the formed heat accumulative material has a bulk density of 0.3 to 3 times the bulk density of the gas adsorbing material. It is more preferable that that the formed heat accumulative material has a bulk density of 0.5 to 2 times the bulk density of the gas adsorbing material. If the bulk densities of the formed heat accumulative material and the gas adsorbing material are largely different, relatively heavy one of them moves downward in the casing when they are mounted as the gas storage canister on an automotive vehicle or the like and subjected to vibration, so that separation of them will be promoted.

The formed heat accumulative material and the gas adsorbing material are mixed in such a mix proportion that the formed heat accumulative material is in an amount ranging from 5 to 40% by weight, more preferably 10 to 35% by weight, based on the total amounts of the formed heat accumulative material and the gas absorbing material. If the mix proportion of the formed accumulative material is excessively small, the effect of suppressing a temperature change of the gas adsorbing material cannot be sufficiently obtained. In contrast, if the mix proportion of the formed accumulative material is excessively large, the ratio of the gas adsorbing material is decreased thereby lowering a gas adsorption amount per unit volume of the gas storage canister. According to the present invention, the heat accumulative material is formed by micro-encapsulation of the phase change material, and therefore a sufficient heat reservation effect can be obtained with a relatively small mix proportion of the formed heat accumulative material, thereby raising the gas adsorption amount per unit volume of the gas storage canister.

Another embodiment of the gas storage canister is as follows: The gas storage canister includes the formed heat accumulative material which is the same as that of the above-discussed preferable embodiment. The gas adsorbing material is powdered one and is adhered to the surface of the formed heat accumulative material. The formed heat accumulative material coated with the powdered gas adsorbing material is filled in the casing of the gas storage canister. For example, the powdered gas adsorbing material is coated at the surface of the formed head accumulative material by using binder or solvent, and then dried to be fixedly adhered to the surface of the heat accumulative material. With this configuration, the gas adsorbing material is located at the surface of the formed heat accumulative material, and therefore a gas adsorbing action of the gas adsorbing material cannot be hampered by the heat accumulative material.

According to the present invention, the temperature change due to gas adsorption and desorption of the gas adsorbing material is suppressed under the heat reservation action of the phase change material, so that a high gas adsorbing performance of the gas storage canister can be obtained. Particularly by using the heat accumulative agent formed by micro-encapsulation is used as the formed heat accumulative material, the heat accumulative material can exist in such a mixed sate with the gas adsorbing material as not to degrade the gas adsorbing action of the gas adsorbing material while preventing breakage of the micro-capsules of the heat accumulative material. Additionally, separation of the gas adsorbing material and the heat accumulative material can be effectively suppressed even upon receiving vibration during vehicle running, thereby maintaining a high performance of the gas storage canister throughout a long period of time.

EXAMPLES

The present invention will be more readily understood with reference to the following Examples in comparison with Comparative Examples; however, these Examples are intended to illustrate the invention and are not to be construed to limit the scope of the invention.

Example 1

A 37% formaldehyde aqueous solution in an amount of 6.5 g and water in an amount of 10 g were added to 5 g of powdered melamine to form a mixture. The mixture was adjusted to have a pH of 8, and then heated to about 70° C. thereby obtaining a melamine-formaldehyde initial-stage condensation product.

A mixture solution was prepared by dissolving 80 g of n-eicosane serving as a phase change material into 100 g of a sodium salt aqueous solution of stylene-maleic anhydride copolymer which solution had been adjusted to pH 4.5. This mixture solution was added to the above melamine-formaldehyde initial-stage condensation product while being vigorously stirred thereby making emulsification, followed by a pH adjustment to pH 9, thus accomplishing a micro-encapsulation to form micro-capsules dispersed in the solution. Thereafter, solvent of the solution in which the micro-capsules were dispersed was removed upon being dried thus obtaining powdered bodies or micro-capsules (heat accumulative agent) each of which was n-eicosane micro-encapsulated with a film or outer shell of melamine.

A carboxymethyl cellulose aqueous solution was added as a binder to the above obtained powdered heat accumulative agent and mixed with each other to form a mixture. The mixture was subjected to an extrusion forming so as to be formed into the column-like shape and dried, followed by being cut thereby to obtain a column-like formed heat accumulative material having a diameter of about 2 mm and a length ranging from 1 to 5 mm.

Additionally, a wood-based formed activated carbon was prepared by mixing a powdered wood-based activated carbon with a binder (bentonite or clay) and subjected to an extrusion forming similar that for the formed heat accumulative material. The prepared formed activated carbon was column-like and had a diameter of about 2 mm and a length ranging from 1 to 5 mm.

Subsequently, 20% by weight (mix proportion) of the above formed heat accumulative material and 80% by weight (mix proportion) of the above formed activated carbon were uniformly mixed, and filled in a casing formed of nylon resin and having a volume of 900 cc, thus producing a gas storage canister A.

Example 2

A procedure of Example 1 was repeated with the exception that the mix proportions of the formed heat accumulative material and the wood-based formed activated carbon were respectively 40% by weight and 60% by weight. Thus, a gas storage canister B was produced.

Example 3

A procedure of Example 1 was repeated with the exception that the mix proportions of the formed heat accumulative material and the wood-based formed activated carbon were respectively 60% by weight and 40% by weight. Thus, a gas storage canister C was produced.

Example 4

A procedure of Example 1 was repeated with the following exception: In order to obtain the formed heat accumulative material, a methanol solution of phenol-formaldehyde resin (or a similar thermosetting resin solution) was added as a binder (in place of carboxymethyl cellulose aqueous solution) to the powdered heat accumulative agent and kneaded to form a mixture. The mixture was subjected to an extrusion forming so as to be formed into the column-like shape and dried, followed by being cut thereby obtaining a column-like formed heat accumulative material having a diameter of about 2 mm and a length ranging from 1 to 5 mm. Thus, a gas storage canister D was produced.

Example 5

A column-like formed heat accumulative material having a diameter of about 2 mm and a length ranging from 1 to 5 mm was obtained by the same manner as in Example 1. This column-like formed heat accumulative material was added together with finely powdered activated carbon (having particle diameters ranging from 5 to 50 μm) into a carboxymethyl cellulose aqueous solution, and kneaded to form a mixture. The mixture was subjected to an extrusion forming so as to be formed into the column-like shape and dried, followed by being cut thereby obtaining a column-like formed gas adsorbing material provided with a heat accumulating function and having a diameter of about 2 mm and a length ranging from 1 to 5 mm. This gas adsorbing material was filled in a casing formed of nylon resin and having a volume of 900 cc, thus producing a gas storage canister E.

Comparative Example 1

A wood-based formed activated carbon was prepared in the same manner as in Example 1. Only this wood-based formed activated carbon was filled in a casing formed of nylon resin and having a volume of 900 cc, thus producing a gas storage canister F.

Comparative Example 2

Powdered bodies or micro-capsules (heat accumulative agent) were obtained by the similar manner to that of Example 1 with the exception that n-octadecane was used as the phase change material in place of n-eicosane. This heat accumulative agent was added to a carboxymethyl cellulose aqueous solution to form a slurry. Water was added to this slurry to adjust the viscosity and concentration of the slurry. The slurry was sprayed onto a formed activated carbon (the same as that of Example 1) by using a coating apparatus in such a manner that the amount of the heat accumulative agent was 25% by weight, so that the micro-capsules were uniformly coated on the surface of the formed activated carbon. This coated formed activated carbon was dried thereby to obtain a column-like formed gas adsorbing material provided with a heat accumulating function under the action of the heat accumulative agent adhered to the outer surface of the activated carbon. This gas adsorbing material was filled in a casing formed of nylon resin and having a volume of 900 cc, thus providing a gas storage canister G.

EXPERIMENT

FIG. 1 shows the relationship between the mix proportion of the heat accumulative material and the amount ("fuel vapor adsorption amount") of fuel vapor adsorbed by the gas storage canister, for the gas storage canisters A, B and C (respectively of Examples 1, 2 and 3) and the gas storage canister F (of Comparative Example 1). It is apparent from FIG. 1 that the gas storage canisters of respective Examples 1, 2 and 3 using the formed heat accumulative materials in certain amounts are improved in fuel vapor adsorption amount over the gas storage canister of Comparative Example 1 using only the activated carbon. It is also apparent from FIG. 1 that the gas storage canister of Example 1 including 20% by weight of the formed heat accumulative material is the best in fuel vapor adsorption amount, while the gas storage canisters including 40% by weight or more of the formed heat accumulative material are lowered in fuel vapor adsorption amount because the mix proportion of the activated carbon as the gas adsorbing material is less.

Figure 2:
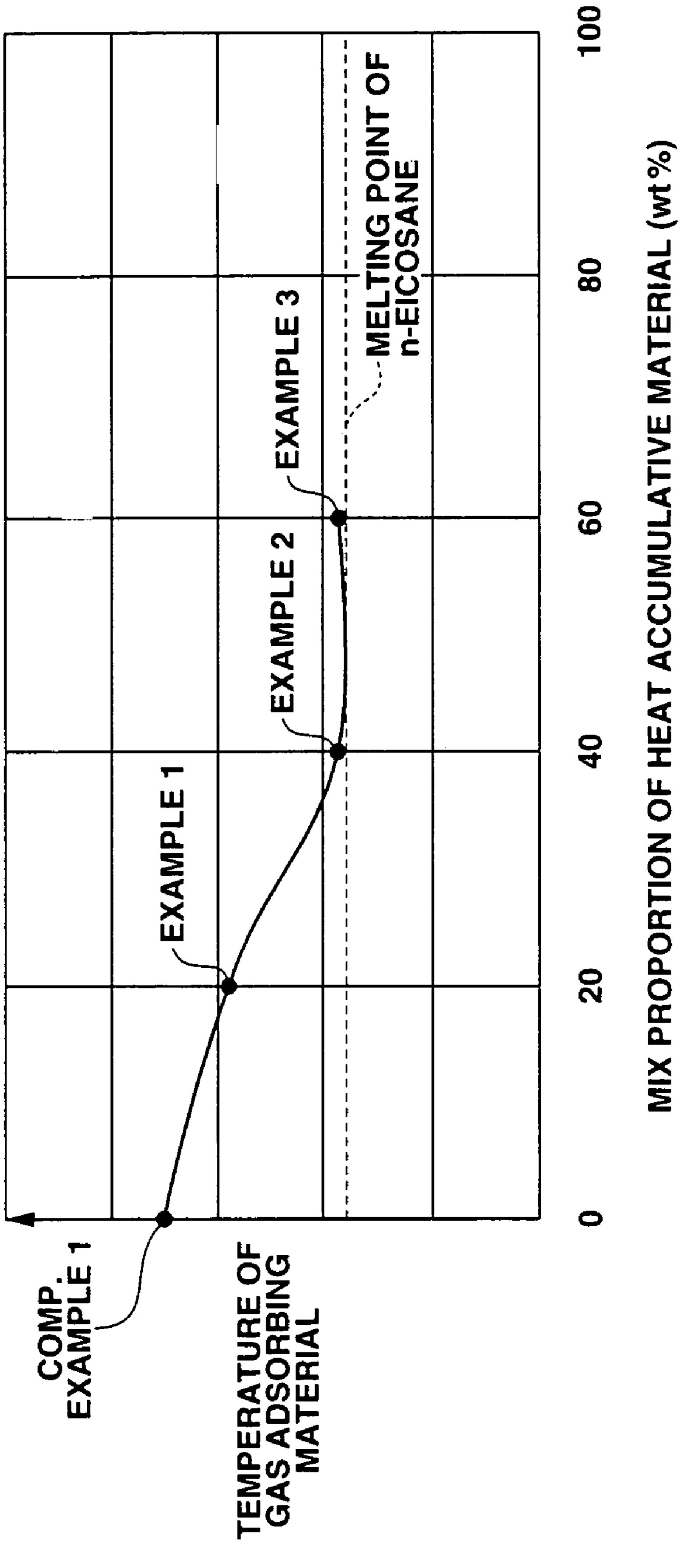
FIG. 2 is a graph showing the relationship between the mix proportion of the heat accumulative material (% by weight) and the temperature of a gas adsorbing material, for Examples 1 to 3 and Comparative Example 1.

FIG. 2 shows measured temperature rises of the gas adsorbing material during fuel vapor adsorption to the gas adsorbing material, for the gas storage canisters A, B and C (respectively of Examples 1, 2 and 3) and the gas storage canister F (Comparative Example 1). Specifically, FIG. 2 shows the relationship between the mix proportion of the heat accumulative material and the temperature of the gas adsorbing material. As apparent from FIG. 2, the temperature rise during fuel vapor adsorption can be effectively suppressed under the heat reservation effect of the formed heat accumulative material. However, in a region where the mix proportion of the heat accumulative material is 40% by weight or more, the melting point of the phase change material is reached, so that a further temperature lowering cannot occur even though the mix proportion of the formed heat accumulative material increases.

Figure 3:
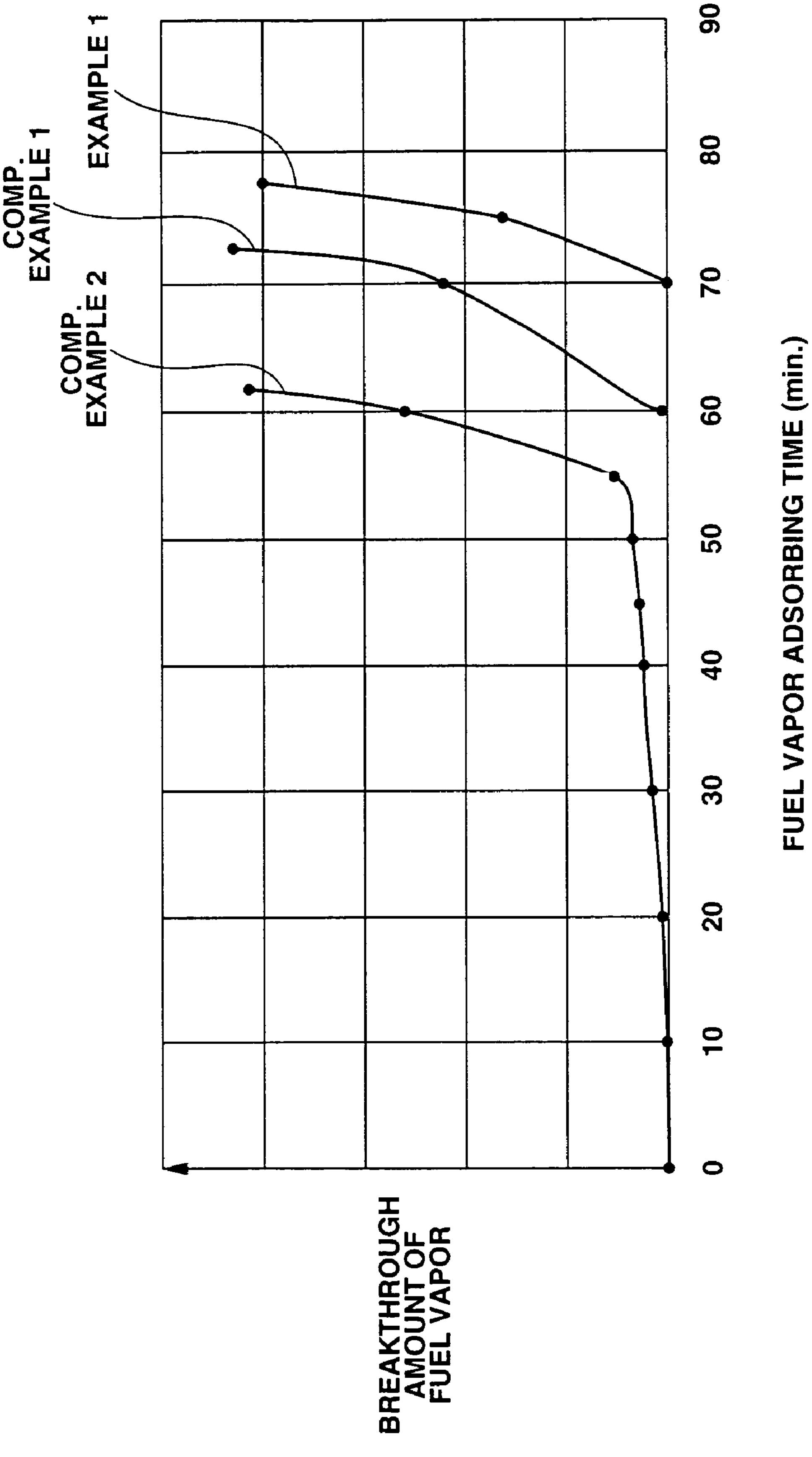
FIG. 3 is a graph showing the relationship between the fuel adsorbing time (min.) and the breakthrough amount of fuel vapor, providing breakthrough curves, for Example 1 and Comparative Examples 1 and 2.
Figure 4:
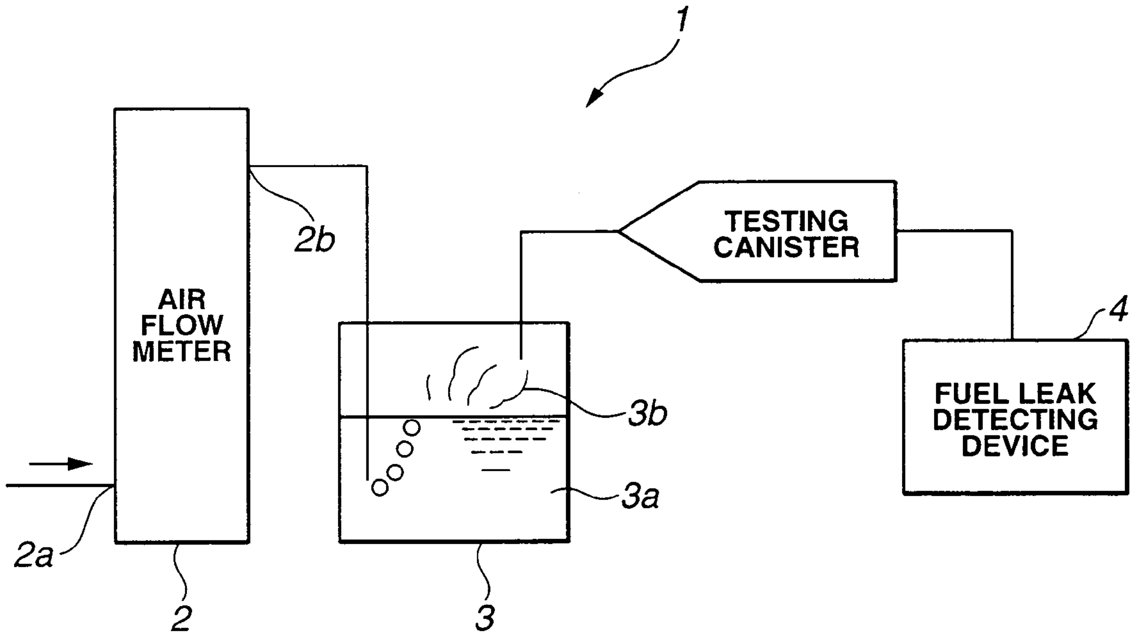
FIG. 4 is a schematic illustration of a test apparatus used in a test conducted for obtaining the graph of FIG. 3.

FIG. 3 shows the relationship between the time ("fuel vapor adsorbing time") for which fuel vapor is adsorbed by the gas storage canister ("testing canister") and the breakthrough amount of fuel vapor, for the gas storage canisters A (Example 1) and F and G (respectively of Comparative Examples 1 and 2). The relationship was measured by a test conducted by using a test apparatus 1 as shown in FIG. 4. The test apparatus was arranged as follows: The inlet of each of the gas storage canisters A, F and G was connected to a fuel container 3. An air flow meter 2 was connected at its outlet to the fuel container 3. Additionally, a fuel leak detecting device 4 was connected to the outlet of the testing ii canister. In the test with this test apparatus, air was introduced through the inlet 2*a* of the air flow meter 2 and supplied through the outlet 2*b* of the air flow meter 2 into liquid fuel 3*a* in the fuel container 3 at an air flow rate of 1.0 liter per minute thereby bubbling liquid fuel 3*a* to generate fuel vapor 3*b*. The fuel vapor was fed into the testing canister to be adsorbed in the testing canister, in which the breakthrough (leak) amounts of fuel vapor from the testing canister were measured by the fuel leak detecting device 4 at the certain fuel vapor adsorbing times. During the test, atmospheric temperature was maintained at 25° C. FIG. 3 depicts that the gas storage canister A of Example 1 does not indicate fuel leak or breakthrough for a long time as compared with the gas storage canister of Comparative Example 1 using only the activated carbon, thereby exhibiting a good vapor adsorbing performance. With the gas storage canister G of Comparative Example 2 in which the powdered heat accumulative agent is adhered to the outer surface of the activated carbon, fuel leak or breakthrough occurs for a short time as compared with the gas storage canister F of Comparative Example 1 using only the activated carbon. Consequently, it is not preferable that the powdered heat accumulative agent is adhered to the surface of the gas adsorbing material like the gas storage canister G of Comparative Example 2.

The entire contents of Japanese Patent Application P2004-044253 (filed Feb. 20, 2004) are incorporated herein by reference.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

What is claimed is:

1. A vapor storage canister comprising:

a casing;

a granular formed heat accumulative material disposed in the casing and including a powdered heat accumulative agent formed of micro-capsules each of which contains a phase changing material which absorbs and releases latent heat in accordance with a temperature change, and a binder for binding the heat accumulative agents; and a granular gas absorbing material disposed in the casing and mixed with the heat accumulative material.

2. A gas storage canister as claimed in claim 1, wherein the phase change material is a compound having a melting point ranging from 10 to 80° C.

3. A gas storage canister as claimed in claim 1, wherein the formed heat accumulative material has an average particle diameter within a range of 10 to 300% of an average particle diameter of the gas absorbing material.

4. A gas storage canister as claimed in claim 1, wherein the gas absorbing material is an activated carbon.

5. A gas storage canister as claimed in claim 1, wherein granules of the formed heat accumulative material have particle sizes ranging from 1 to 5 mm, and the gas absorbing material has been formed into granules which have particle sizes ranging from 1 to 5 mm.

6. A gas storage canister as claimed in claim 1, wherein granules of the formed heat accumulative material and the gas absorbing material are column-like and have diameters ranging from 1 to 3 and lengths ranging from 1 to 5 mm.

7. A gas storage canister as claimed in claim 1, wherein the formed heat accumulative material and the gas absorbing material has a bulk density ranging from 0.1 to 1.5 g/cc.

8. A gas storage canister as claimed in claim 1, wherein the formed accumulative material has a bulk density ranging from 0.3 to 3 times a bulk density of the gas absorbing material.

9. A gas storage canister as claimed in claim 1, wherein the formed heat accumulative material is in an amount ranging from 5 to 40% by weight based on total of the formed heat accumulative material and the gas absorbing material.

10. A gas storage canister as claimed in claim 1, wherein the binder is formed of a thermosetting resin.

11. A method of producing a vapor storage canister, comprising the steps of:

forming a powdered heat accumulative agent formed of micro-capsules into a granular heat accumulative material by mixing the powered heat accumulative agent with a binder, each of the micro-capsule containing a phase changing material which absorbs and releases latent heat in accordance with a temperature change;

forming a granular gas absorbing material; and mixing the granular heat accumulative material and the granular gas absorbing material and filling them into a casing.

* * * * *